United States Patent
Linnen et al.

(10) Patent No.: US 10,564,861 B2
(45) Date of Patent: Feb. 18, 2020

(54) PARITY RELOCATION FOR REDUCING TEMPERATURE THROTTLING

(71) Applicant: Western Digital Technologies, Inc., San Jose, CA (US)

(72) Inventors: Daniel Joseph Linnen, Naperville, IL (US); Dongxiang Liao, Sunnyale, CA (US); Jagdish Machindra Sabde, Fremont, CA (US); Avinash Rajagiri, San Jose, CA (US); Ashish Pal Singh Ghai, Mountain View, CA (US); Abhinav Anand, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/955,432

(22) Filed: Apr. 17, 2018

(65) Prior Publication Data

US 2019/0317672 A1    Oct. 17, 2019

(51) Int. Cl.
*G06F 3/06* (2006.01)

(52) U.S. Cl.
CPC .......... *G06F 3/0616* (2013.01); *G06F 3/0631* (2013.01); *G06F 3/0635* (2013.01); *G06F 3/0647* (2013.01); *G06F 3/0688* (2013.01)

(58) Field of Classification Search
CPC .... G06F 3/0616; G06F 3/0631; G06F 3/0635; G06F 3/0647; G06F 3/0688
See application file for complete search history.

(56) References Cited

U.S. PATENT DOCUMENTS

| | | |
|---|---|---|
| 8,386,833 B2 | 2/2013 | Smith et al. |
| 9,355,024 B2 | 5/2016 | Nguyen et al. |
| 9,489,146 B2 | 11/2016 | Erez |
| 9,658,791 B2 | 5/2017 | Jayaraman et al. |
| 9,734,887 B1 | 8/2017 | Tawa |
| 2014/0071751 A1* | 3/2014 | Kim .................. G11C 16/14 365/185.03 |

(Continued)

OTHER PUBLICATIONS

Lee et al, "Lifetime Management of Flash-Based SSDs Using Recovery-Aware Dynamic Throttling"; http://www.usenix.net/legacy/events/fast12/tech/full_papers/Lee.pdf; 14 pages, 2012.

*Primary Examiner* — Larry T MacKall
(74) *Attorney, Agent, or Firm* — Loza & Loza, LLP; Gabriel Fitch

(57) ABSTRACT

Aspects of the disclosure provide for reducing a temperature of one or more non-volatile memory (NVM) dies of a solid state drive (SSD). The methods and apparatus detect a temperature of one or more NVM dies of a plurality of NVM dies of the SSD, the plurality of NVM dies including at least one parity NVM die, and determine that the one or more NVM dies is overheated when the detected temperature is at or above a threshold temperature. If the detected temperature is at or above the threshold temperature, the methods and apparatus redirect parity data designated for the at least one parity NVM die to the one or more overheated NVM dies. By repurposing the one more overheated NVM dies to store the parity data, the repurposed dies will experience less activity, and therefore, generate less heat without throttling or reducing the workload capability of the dies.

17 Claims, 7 Drawing Sheets

(56) References Cited

U.S. PATENT DOCUMENTS

| | | |
|---|---|---|
| 2014/0281311 A1 | 9/2014 | Walker et al. |
| 2015/0220278 A1* | 8/2015 | Sarcone ................. G06F 3/061 |
| | | 711/103 |
| 2016/0283143 A1 | 9/2016 | Guo et al. |
| 2016/0284403 A1* | 9/2016 | Navon ................ G06F 11/1068 |
| 2016/0320971 A1 | 11/2016 | Postavilsky et al. |

* cited by examiner

PARITY RELOCATION FOR REDUCING TEMPERATURE THROTTLING

FIELD

The present disclosure relates generally to solid state drives (SSDs) including non-volatile memories (NVMs), and more specifically, to methods and apparatus for reducing temperature of one or more overheated memory dies of a SSD without reducing a workload capacity of the one or more dies and/or the SSD.

INTRODUCTION

In a variety of consumer electronics, solid state drives (SSDs) incorporating non-volatile memories (NVMs) are frequently replacing or supplementing conventional rotating hard disk drives for mass storage. These non-volatile memories may include one or more flash memory devices, such as NAND flash memories, and the flash memory devices may be logically divided into blocks with each of the blocks further divided into logically addressable pages. These logical pages may be any of a variety of sizes (e.g., 512 Bytes, 1 Kilobytes, 2 Kilobytes, 4 Kilobytes). The non-volatile memories may also include phase-change memory (PCM) devices, which are a form of random access memory (RAM) that stores data by altering the state of the matter (e.g., crystalline structure) from which the devices are fabricated.

A power demand of non-volatile memories may lead to an increased generation of heat in a SSD. Notably, a memory die's position within an airstream of a heat source and/or the memory die's material properties may cause the memory die to become hotter than other memory dies in the SSD. As such, problems may occur as the temperature of a non-volatile memory increases to an inappropriate or unsuitably high level (e.g., above a threshold) since the increased temperature typically degrades the reliability of electronics. For example, in a PCM-based memory, unintended crystallization of the structure may occur when the temperature reaches an inappropriate level. In a NAND memory, charge loss may occur when the temperature level is inappropriately high.

Currently, to compensate for the inappropriate increased temperature in the memory die, an entire system may be throttled to lessen the number of operations performed, thus reducing the power demand and minimizing heat generation. However, throttling has a negative effect on workload capacity since, for example, throttling prevents the SSD from performing a maximum number of operations it is normally capable of executing and reduces the number of user accesses to data stored in the overheated memory die. Accordingly, it would be beneficial to be able to reduce the temperature of one or more overheated memory dies of a SSD while still ensuring that the workload capacity of the SSD remains intact.

SUMMARY

According to an aspect of the present disclosure, a method of reducing a temperature of one or more non-volatile memory (NVM) dies of a solid state drive (SSD) is disclosed. The method includes detecting a temperature of one or more NVM dies of a plurality of NVM dies of the SSD, the plurality of NVM dies including at least one parity NVM die designated to store parity data, determining that the one or more NVM dies is overheated when the detected temperature is at or above a threshold temperature, and redirecting the parity data designated for the at least one parity NVM die to the one or more overheated NVM dies. Additionally, the method includes detecting an adjusted temperature of the one or more overheated NVM dies after redirecting the parity data to the one or more overheated NVM dies, and throttling a performance of at least one of the SSD, the one or more overheated NVM dies, or a controller controlling the one or more overheated NVM dies when the adjusted temperature is at or above the threshold temperature.

According to another aspect, a solid state drive (SSD) is disclosed, which includes a plurality of non-volatile memory (NVM) dies, and a controller communicatively coupled to a host device and the plurality of NVM dies. The controller is configured to detect a temperature of one or more NVM dies of the plurality of NVM dies of the SSD, the plurality of NVM dies including at least one parity NVM die designated to store parity data, determining that the one or more NVM dies is overheated when the detected temperature is at or above a threshold temperature, and redirect the parity data designated for the at least one parity NVM die to the one or more overheated NVM dies. Furthermore, the controller is configured to detect an adjusted temperature of the one or more overheated NVM dies after redirecting the parity data to the one or more overheated NVM dies, and throttle a performance of at least one of the SSD, the one or more overheated NVM dies, or the controller when the adjusted temperature is at or above the threshold temperature.

According to yet another aspect, a non-volatile memory (NVM) device including an apparatus for reducing a temperature of one or more NVM dies of a solid state drive (SSD) is disclosed. The apparatus includes means for detecting a temperature of one or more NVM dies of a plurality of NVM dies of the SSD, the plurality of NVM dies including at least one parity NVM die designated to store parity data, means for determining that the one or more NVM dies is overheated when the detected temperature is at or above a threshold temperature, and means for redirecting the parity data designated for the at least one parity NVM die to the one or more overheated NVM dies. The apparatus further includes means for detecting an adjusted temperature of the one or more overheated NVM dies after redirecting the parity data to the one or more overheated NVM dies, and means for throttling a performance of at least one of the SSD, the one or more overheated NVM dies, or a controller controlling the one or more overheated NVM dies when the adjusted temperature is at or above the threshold temperature.

DETAILED DESCRIPTION

The present disclosure provides methods and apparatus for reducing a temperature of one or more non-volatile memory (NVM) dies of a solid state drive (SSD). The SSD may include a plurality of NVM dies including at least one parity NVM die designated to store parity data. In order to efficiently reduce the temperature of one or more NVM dies of the plurality of NVM dies, a controller may detect the temperature of the one or more NVM dies and compare the detected temperature to a threshold temperature. If the controller detects that the temperature is at or above the threshold temperature, the controller determines that the one or more NVM dies is overheated and may relocate XOR parity data designated for the at least one parity NVM die to the one or more overheated NVM dies. Accordingly, by repurposing the one or more overheated NVM dies to store the parity data, the repurposed dies will experience less activity, and therefore, generate less heat without throttling or reducing the workload capability of the dies. In an aspect, the controller may relocate the parity data by selecting parity data for future write operations to be written in the one or more overheated NVM dies instead of the at least one parity NVM die. In another aspect, the controller may relocate the parity data by migrating user data stored in the one or more overheated NVM dies away from the one or more overheated NVM dies, and writing the parity data into the one or more overheated NVM dies.

Before discussing the present methods and apparatus, it is noted that known solutions for reducing the temperature of an overheated memory die involve throttling a performance capacity of an entire SSD, a controller, and/or the memory die itself. Throttling lessens the number of operations capable of being performed at a device and thereby minimizes heat generation. However, throttling comes with performance costs. For example, throttling prevents the SSD from performing a maximum number of operations it is normally capable of executing. Moreover, throttling reduces the number of user accesses to data stored in the overheated memory die. As such, the known solutions for cooling an overheated memory die hurt efficiency and degrade the workload capacity of the SSD, controller, and/or the memory die.

In light of the known solutions, the presently disclosed methods and apparatus for reducing the temperature of one or more overheated memory dies of a SSD are advantageous for preventing data corruption and device breakdown while ensuring that the workload capacity of a SSD, controller, and/or memory die remains intact.

Figure 1:
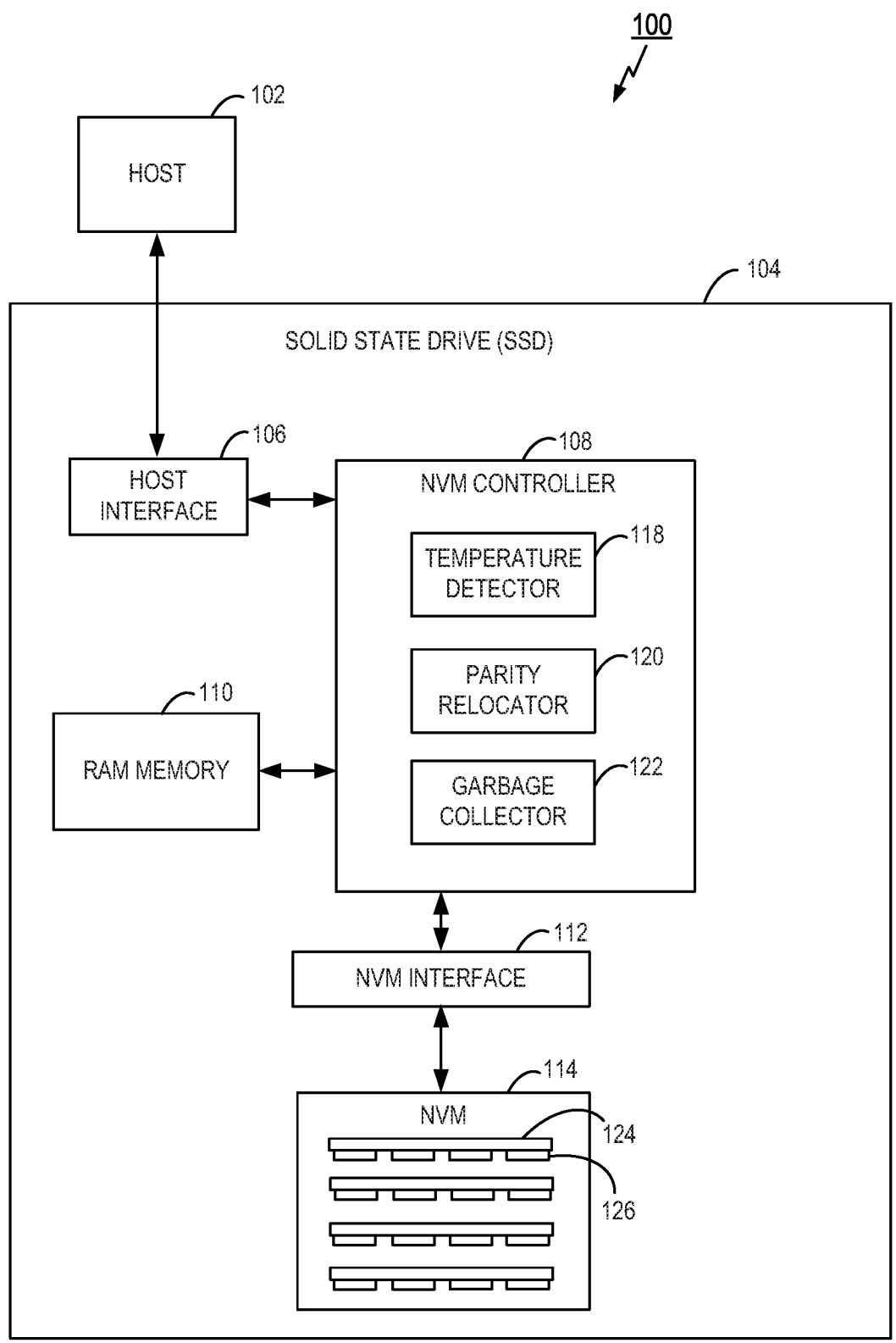
FIG. 1 is a block diagram of an exemplary solid state drive (SSD) in which parity data relocation may be performed in accordance with aspects of the present disclosure.

Referring to the drawings, FIG. 1 is a block diagram of a system 100 including an exemplary solid state drive (SSD) in which the disclosed parity data relocation may be implemented in accordance with aspects of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or a read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, a workstation, a server, a personal digital assistant, a digital camera, or a digital phone as merely a few examples.

The SSD storage device 104 includes a host interface 106, a controller 108 (or alternatively, an NVM controller 108), a RAM memory 110, a non-volatile memory (NVM) interface 112, and a non-volatile memory (NVM) 114, such as a NAND Flash memory or a phase-change memory (PCM), for example. The host interface 106 is coupled to the controller 108 and facilitates communication between the host 102 and the controller 108. Additionally, the controller 108 is coupled to the RAM memory 110 as well as the NVM 114 via the NVM interface 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote computing system communicatively coupled with the host 102. For example, the host 102 may communicate with the SSD storage device 104 through a wireless communication link.

The controller 108 controls operation of the SSD storage device 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD storage device 104. In some aspects, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The RAM memory 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory.

The NVM 114 receives data from the controller 108 via the NVM interface 112 and stores the data. The NVM 114 may be any type of non-volatile memory, such as a flash storage system, a NAND-type flash memory, a solid state drive, a flash memory card, a secure digital (SD) card, a universal serial bus (USB) memory device, a CompactFlash card, a SmartMedia device, a flash storage array, a phase-change memory (PCM) device, or the like. The NVM 114 may include one or more memory modules 124, wherein one or more memory dies 126 are formed as part of a memory module 124.

In a further aspect, the controller 108 may include a temperature detector 118 for sensing the temperature of one or more memory dies of the NVM 114. The controller 108 may also include a parity relocator process, algorithm, or circuit/module 120 that relocates parity data from one or more memory dies of the NVM 114 to one or more overheated dies of the NVM 114. Furthermore, the controller 108 may include a garbage collector process, algorithm, or circuit/module 122 that copies valid data into new or free areas and erases invalid data in physical block locations of the NVM 114 in order to free invalid memory space.

The controller 108 or NVM 114 can be configured to perform any of the processes described herein for reducing a temperature of one or more overheated NVM dies by redirecting parity data designated to be stored in at least one parity NVM die to the one or more overheated NVM dies when a detected temperature of the one or more overheated NVM dies is at or above a threshold temperature.

A power demand of non-volatile memories may lead to an increased generation of heat in a SSD (e.g., SSD storage device 104). Notably, a memory die's position within an airstream of a heat source and/or the memory die's material properties may cause the memory die to become hotter than other memory dies. As such, problems may occur as the temperature of a non-volatile memory increases to an inappropriate level (e.g., above a threshold temperature). For example, in a PCM-based memory, unintended crystallization of the structure may occur when the temperature increases above a threshold level leading to data corruption. In a NAND memory, charge loss and device breakdown (endurance loss) may occur at a temperature level above a threshold.

Figure 2:
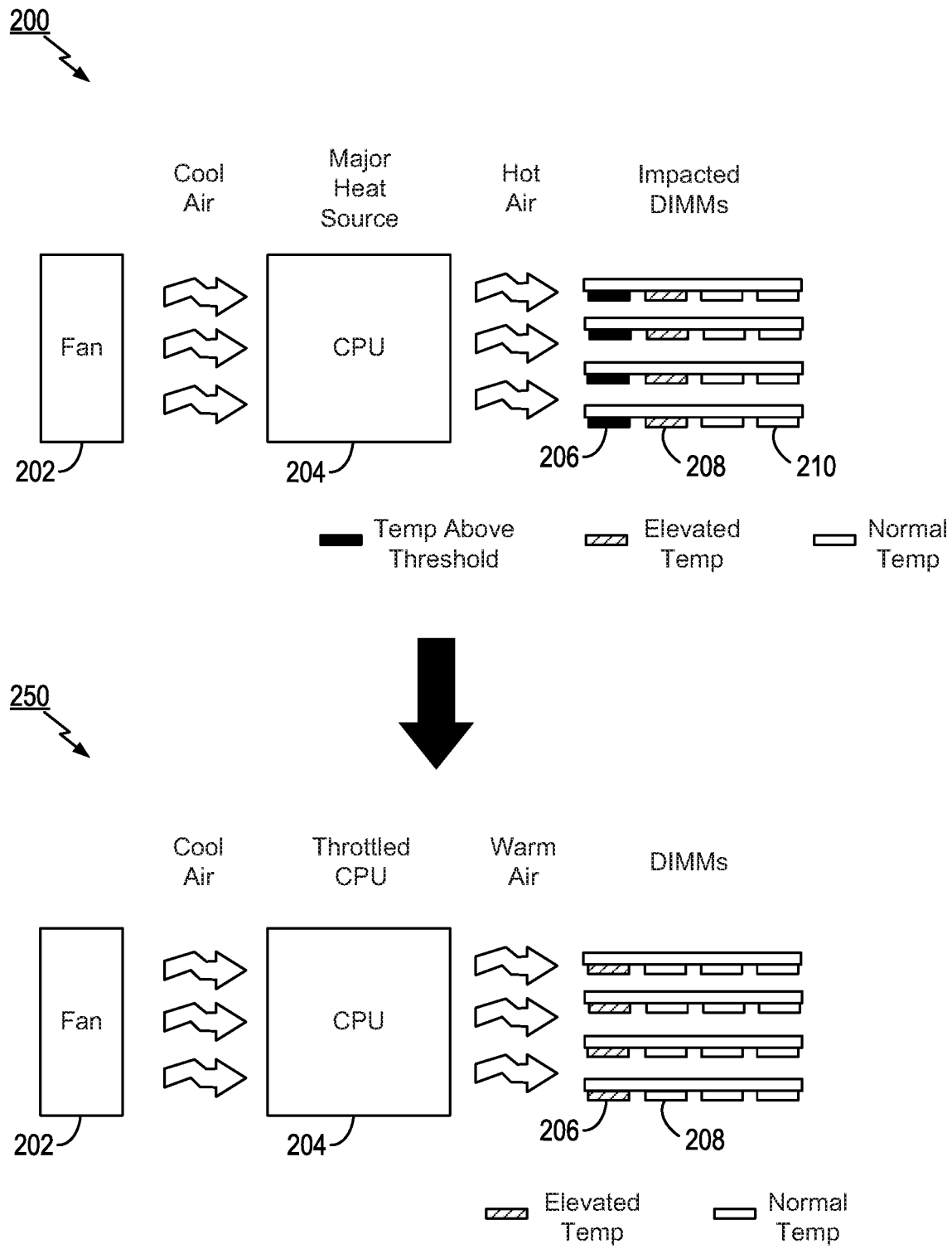
FIG. 2 illustrates diagrams of an example process for cooling one or more overheated dies/packages of a SSD.

FIG. 2 illustrates diagrams of an example process for cooling one or more overheated dies/packages of a SSD. As shown, a system 200 may include a fan 202 for blowing cool air onto a central processing unit (CPU) 204 (e.g., controller 108). As the CPU 204 operates, the CPU 204 generates heat that heats/warms the air surrounding the CPU 204. In the example shown, the CPU 204 is a major heat source that causes hot air to move toward memory dies/packages of a SSD. In an aspect, the memory dies/packages are formed as part of dual in-line memory modules (DIMMs) (e.g., memory modules 124 of NVM 114). However, it is contemplated that the memory dies/packages may be part of any other types of memory modules.

In an aspect of the disclosure, a temperature of a memory die may be affected by a proximity of the memory die to the CPU 204. For example, memory dies 210 may be in remote proximity to the CPU 204. As such, the memory dies 210 are not within an airstream (e.g., thermal exhaust path) of the CPU 204 and may therefore operate at a normal temperature as the hot air within the CPU's airstream does not cause the temperature of the memory dies 210 to increase. In another example, memory dies 208 may be in intermediate proximity to the CPU 204. As such, the memory dies 208 may be within the CPU's airstream but not close enough to the CPU 204 such that the hot air within the CPU's airstream raises the temperature of the memory dies 208 above a threshold temperature level (e.g., inappropriate or unsuitably high temperature). Therefore, the memory dies 208 may operate at an elevated temperature that is below the threshold temperature level. In a further example, memory dies 206 may be in near proximity (e.g., nearest amongst other memory dies) to the CPU 204. As such, the memory dies 206 may be close enough to the CPU 204 such that the hot air within the CPU's airstream raises the temperature of the memory dies 206 to or above the threshold temperature level. The memory dies 206 may be considered to be overheated when operating at or above the threshold temperature level. In certain aspects, the threshold temperature level may be, for example, 3 to 5 degrees Celsius or 5 to 10 degrees Celsius above a neighboring die temperature. In other aspects, the threshold temperature level may be any arbitrary temperature specific to a memory, product, application, and/or customer. For example, the threshold temperature level for a NAND may be set to 75 degrees Celsius. In another example, the threshold temperature level for a SSD may be set to 55 degrees Celsius.

In an aspect, an entire system may be throttled to minimize heat generation. An example process for cooling down the overheated memory dies 206 may be described with respect to a system 250. As shown, the system 250 may include the fan 202 still blowing cool air onto the CPU 204 (e.g., controller 108). However, the CPU 204 may be throttled to lessen the number of operations capable of being performed by the CPU 204. Accordingly, as the CPU 204 operates in the throttled state, less heat is generated to heat/warm the air surrounding the CPU 204. In the example shown, the temperature of the air caused to move toward the memory dies/packages of the SSD is less intense, and therefore, no longer causes the temperature of the memory dies/packages to increase to or above the threshold temperature level. For example, the memory dies 206 in near proximity to the CPU 204 are no longer overheated and operate at an elevated temperature but below the threshold temperature level. In a further example, the memory dies 208 in intermediate proximity to the CPU 204 no longer operate at an elevated temperature, but at a normal temperature.

As described above (and as will be described below), a temperature of a memory die may be affected by its proximity to a CPU. However, the present disclosure contemplates that the temperature of the memory die may also be affected by its proximity to other system components/devices. For example, a memory die being in near proximity (e.g., nearest amongst other memory dies) to a power regulator or power generation circuitry may cause the memory die to increase its temperature more than other memory dies. In another example, a device such as a dynamic random access memory (DRAM) may facilitate numerous access operations, and therefore, generate a large amount of heat. As such, a memory die in near proximity to the DRAM may experience increased heat. In a further example, a memory die that is in near proximity to an application-specific integrated circuit (ASIC) may experience increased temperature. A memory die may even be caused to overheat due to other memory dies. For example, if nine memory dies of a data array are arranged in a 3×3 configuration, a memory die located in the center of the 3×3 configuration may become overheated due to the heat emitted from the surrounding eight memory dies. Any combination of heat generating system components/devices may be the heat source responsible for overheating a memory die.

Figure 3:
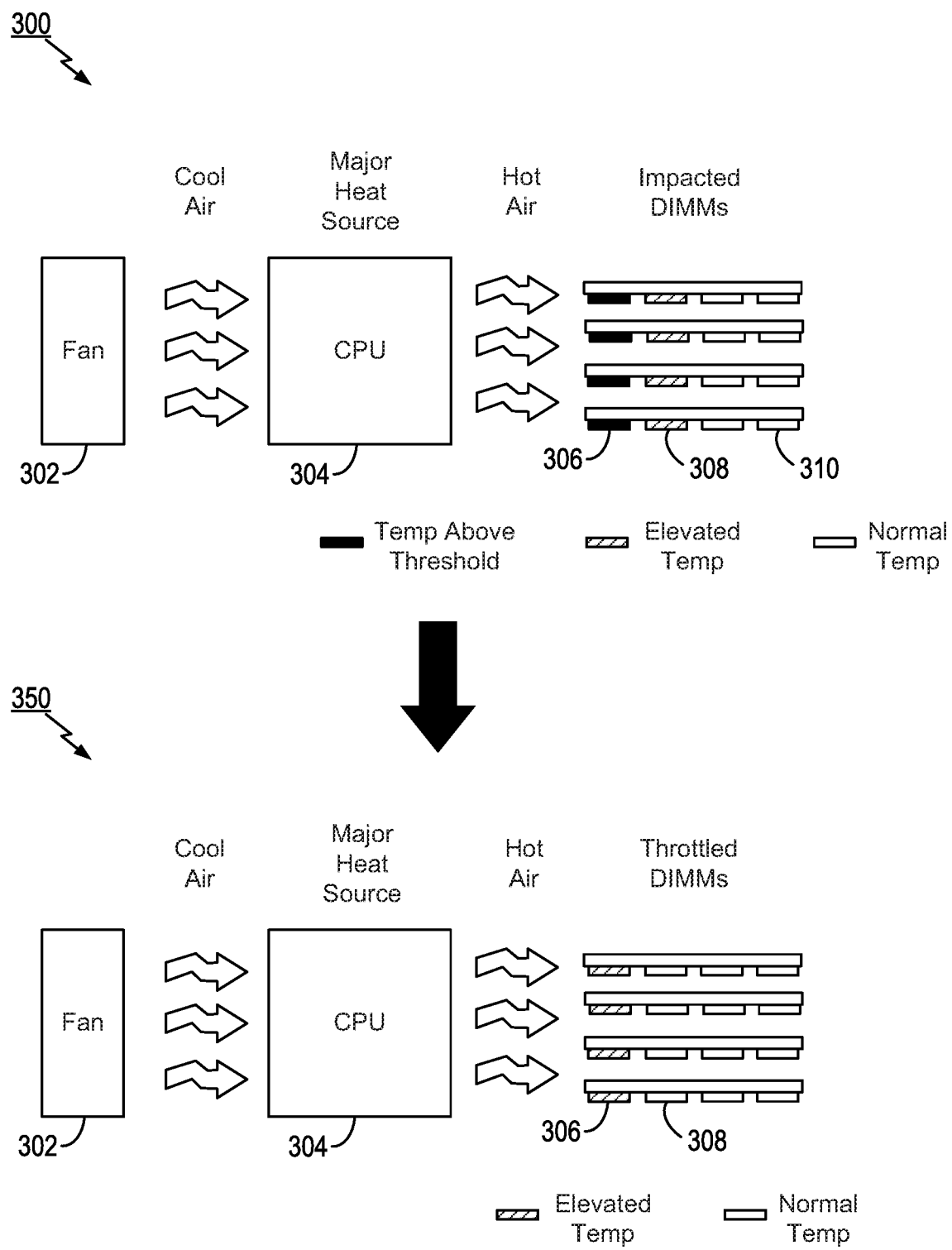
FIG. 3 illustrates diagrams of another example process for cooling one or more overheated dies/packages of a SSD.

FIG. 3 illustrates diagrams of another example process for cooling one or more overheated dies/packages of a SSD. As shown, a system 300 is similar to the system 200 of FIG. 2. The system 300 may include a fan 302 for blowing cool air onto a CPU 304 (e.g., controller 108). As the CPU 304 operates, the CPU 304 generates heat that heats/warms the air surrounding the CPU 304, and further causes hot air to move toward memory dies/packages of a SSD.

As noted above, a temperature of a memory die may be affected by a proximity of the memory die to the CPU. Accordingly, memory dies 310 that are in remote proximity to the CPU 304 are not within an airstream of the CPU 304 and may therefore operate at a normal temperature as the hot air within the CPU's airstream does not cause the temperature of the memory dies 310 to increase. Moreover, memory dies 308 that are in intermediate proximity to the CPU 304 may be within the CPU's airstream but not close enough to the CPU 304 such that the hot air within the CPU's airstream raises the temperature of the memory dies 308 to or above a threshold temperature level (e.g., inappropriate or unsuitably high temperature). Additionally, memory dies 306 that are in near proximity (e.g., nearest amongst other memory dies) to the CPU 304 are close enough to the CPU 304 such that the hot air within the CPU's airstream raises the temperature of the memory dies 306 to or above the threshold temperature level.

In an aspect, a memory die may be throttled to decrease the memory die's temperature. Another example process for cooling down the overheated memory dies 306 may be described with respect to a system 350. As shown, the system 350 may include the fan 302 still blowing cool air onto the CPU 304 (e.g., controller 108). Moreover, the CPU 304 is still a major heat source that causes hot air to move toward memory dies/packages of a SSD. However, one or more of the memory dies/packages may be throttled to reduce the number of user accesses to data stored therein. As the number of user accesses to a memory die is reduced, the temperature of the memory die decreases as a result of less activity. In the example shown, the memory dies 306 are no longer overheated as they are throttled to operate at an elevated temperature but below the threshold temperature level. Also, the memory dies 308 in intermediate proximity to the CPU 304 are throttled to no longer operate at an elevated temperature, but at a normal temperature.

As described with respect to FIGS. 2 and 3, to compensate for the increased temperature in the memory dies/packages, either an entire system or a memory die/package may be throttled to lessen the number of operations performed and thereby minimize heat generation. For example, if a memory die becomes overheated, a CPU (e.g., CPU 204 or controller 108) may be throttled so that the CPU does not emit as much heat. Consequently, by reducing the heat emitted from the CPU, the temperature of the overheated memory die is also reduced. In another example, instead of throttling a CPU (e.g., CPU 304 or controller 108), the overheated memory die (e.g., memory dies 306) may be throttled to lessen its workload capability. Accordingly, because the memory die does not operate at maximum capacity, performance is degraded and die temperature is decreased.

However, throttling has negative effects. For example, throttling hurts efficiency by preventing the SSD from performing a maximum number of operations it is normally capable of executing. Moreover, throttling reduces the number of user accesses to data stored in the overheated memory die. As such, previous solutions for cooling an overheated memory die come with performance costs. Accordingly, what is needed is a novel solution for reducing the temperature of one or more overheated memory dies of a SSD while ensuring that the workload capacity of the SSD remains intact.

In an aspect of the disclosure, an exclusive-OR (XOR) function may be used at a binary level to compute parity values from a data array. Using the XOR function, raw binary data may be passed through an operation that results in a binary result, which can be used for redundancy and error correction. Moreover, XOR parity data may be located in one or more specific dies. For example, in a Redundant Array of Inexpensive Disks Level 4 (RAID-4) architecture, the XOR parity data is located in a dedicated parity die. In a Redundant Array of Inexpensive Disks Level 5 (RAID-5) architecture, the XOR parity data is spread across multiple dies.

SSDs may read from dies storing XOR parity data (XOR parity dies) only during error recovery. Because systems are generally designed to minimize error recovery operations, SSDs may inherently utilize the XOR parity dies less than other dies. Accordingly, a novel solution for cooling one or more overheated dies/packages of a SSD may involve migrating XOR parity data from their original die location to one or more dies that are overheated. By repurposing an overheated die to become the XOR parity die, the repurposed die will naturally experience less activity, and therefore, generate less heat without throttling or reducing the performance (workload capability) of the die. Aspects of the novel solution may further involve migrating the XOR parity data to multiple dies in a same package or location to thermally balance a SSD. The novel solution prevents data corruption as well as loss of endurance (device breakdown), for example, with respect to peripheral circuits, such as charge pumps, sense amplifiers, logic circuits, etc.

Figure 4:
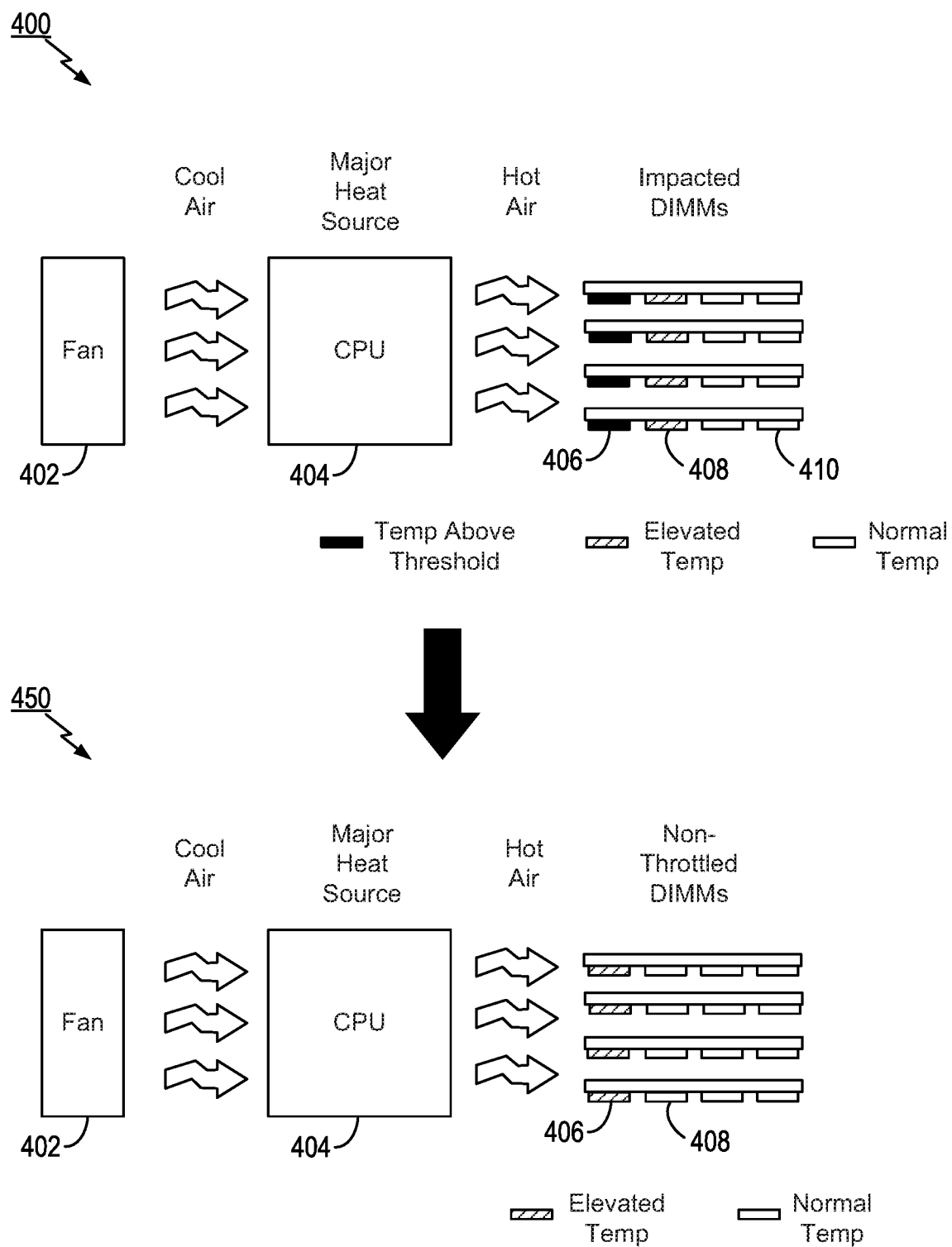
FIG. 4 illustrates diagrams of an example process for cooling one or more overheated dies/packages of a SSD in accordance with aspects of the present disclosure.

FIG. 4 illustrates diagrams of an example process for cooling one or more overheated dies/packages of a SSD in accordance with aspects of the present disclosure. As shown, a system 400 is similar to the system 200 of FIG. 2 and the system 300 of FIG. 3. The system 400 includes a fan 402 blowing cool air onto a CPU 404 (e.g., controller 108). As the CPU 404 operates, the CPU 404 generates heat that heats/warms the air surrounding the CPU 404, and further causes hot air to move toward memory dies/packages of a SSD.

Memory dies 410 that are in remote proximity to the CPU 404 are not within an airstream of the CPU 404 and may therefore operate at a normal temperature as the hot air within the CPU's airstream does not increase the temperature of the memory dies 410. Memory dies 408 that are in intermediate proximity to the CPU 404 may be within the CPU's airstream but not close enough to the CPU 404 such that the hot air within the CPU's airstream raises the temperature of the memory dies 408 to or above a threshold temperature level (e.g., inappropriate or unsuitably high). Memory dies 406 that are in near proximity (e.g., nearest amongst other memory dies) to the CPU 404 are close enough to the CPU 404 such that the hot air within the CPU's airstream raises the temperature of the memory dies 406 to or above the threshold temperature level.

In an aspect, XOR parity data may be relocated to a memory die to decrease the memory die's temperature. An example process for cooling down the overheated memory dies 406 may be described with respect to a system 450. As shown, the system 450 may include the fan 402 still blowing cool air onto the CPU 404 (e.g., controller 108). Moreover, the CPU 404 is still a major heat source that causes hot air to move toward memory dies/packages of a SSD. In an aspect, one or more of the memory dies/packages (e.g. the overheated memory dies 406) may be repurposed to store XOR parity data. By repurposing an overheated memory die 406 to store XOR parity data, the memory die 406 will experience less activity (since XOR parity dies are inherently less-utilized) and consequently generate less heat. As such, the temperature of the memory die 406 will decrease without having to throttle or reduce the workload capability of the die. In the example shown, the memory dies 406 are repurposed to store XOR parity data, and therefore, are no longer overheated as they operate at an elevated temperature but below the threshold temperature level. Also, the memory dies 408 in intermediate proximity to the CPU 404 may be repurposed to store XOR parity data, and therefore, no longer operate at an elevated temperature, but at a normal temperature.

In an aspect of the disclosure, a number of overheated dies to be repurposed for storing XOR parity data may depend on a memory architecture. In the RAID-4 architecture, the XOR parity data is located in a dedicated parity die. Accordingly, if the RAID-4 architecture is implemented, aspects of the present disclosure provide for selecting one specific die that is overheated and relocating all XOR parity data to the selected overheated die. In the RAID-5 architecture, the XOR parity data is spread across multiple dies. Accordingly, if the RAID-5 architecture is implemented, aspects of the present disclosure provide for consolidating XOR parity data from different dies onto one or more dies that are overheated or becoming overheated. For example, if two dies have a temperature at or above the threshold temperature level, XOR parity data may be relocated evenly among the two dies so that read access operations at each die will decrease by approximately 50%. Aspects of the present disclosure may also apply to other memory architectures, such as for example, a RAID-6 architecture that provides for two pieces of XOR parity data, and SSDs that utilize less than a full die of parity coverage (e.g., half a die of parity coverage).

Aspects of the present disclosure relate to a process that reduces temperature of an overheated die (or dies) rather than an entire drive (SSD) in a way that does not reduce the workload capability of the entire drive or the workload capacity of user accesses of the data from the overheated die. Notably, the overheated die is not throttled nor is steady state performance reduced. Rather, the die is being repurposed to store relocated XOR parity data that is less likely to be accessed.

An example process for cooling an overheated die may be as follows. First, the overheated die (or dies) is identified. Second, user data is migrated away from the overheated die and replaced with XOR parity data, which would only be accessed in error recovery cases (very minimal cases).

The overheated die may be identified by detecting a temperature of the die. Multiple ways exist for a controller (e.g., controller 108) to detect temperature. In an example, one or more temperature sensors may be placed on or around a memory die for indicating temperature readings to the controller. Once the controller learns of the memory die that has a temperature above a threshold temperature level (e.g., inappropriate or unsuitably high temperature), the controller may relocate XOR parity data that is minimally accessed to such memory die.

According to certain aspects, the XOR parity data may be relocated to the overheated die according to a passive implementation or an active implementation. In the passive implementation, the controller does not actively move user data out of the impacted die (overheated die). For example, when writing new data, the controller may just ensure that the XOR parity data is stored in the overheated die rather than a die for which the XOR parity data was originally intended without actively migrating the user data out of the overheated die. In another example, the controller may consolidate the XOR parity data in the overheated die for future write operations. That is, for future write operations, the controller may select more XOR parity data to be stored in the overheated die rather than user data.

In the active implementation, the controller may actively migrate user data away from the overheated die and replace the user data with XOR parity metadata. Essentially, the controller may swap the locations of where the user data and the XOR parity data are stored. In some aspects, a one-for-one swap of the user data and the XOR parity data may occur.

In other aspects, when swapping the locations of the user data and XOR parity data, the controller may activate a garbage collection operation to facilitate the migration of user data. For example, when the controller begins swapping the user data and the XOR parity data, the controller may not have enough spare area to move all of the user data off of the overheated die and move in the XOR parity data. Therefore, the controller swaps small amounts of data at a time. As such, the controller may engage a garbage collection operation to migrate the user data appropriately. During garbage collection, the user data from the overheated die may be collected (consolidated) and moved to another memory area that is clear for writing. Thereafter, the user data may be erased. Normally, a SSD may perform garbage collection in the background (e.g., for purposes of data refresh and/or free space consolidation). However, according to aspects of the present disclosure, the garbage collection may be performed based on die temperature. That is, the controller may activate the garbage collection, or increase/decrease a rate of garbage collection, when the controller detects the temperature of a die to be at or above a threshold temperature level in order to move the user data away from the die over a period of time.

In an aspect of the disclosure, one or more temperature sensors may be placed on or around a memory die of a SSD to estimate a heat profile of the SSD. That is, the temperature of a memory die may be detected via the one or more temperature sensors placed in proximity to the memory die. Accordingly, memory dies having a temperature above a threshold level (e.g., inappropriate or unsuitably high temperature) may be mapped based on one or more nearby temperature sensors, and XOR parity data may be relocated from one or more memory dies having a coolest temperature to the memory dies having the temperature above the threshold level.

Figure 5:
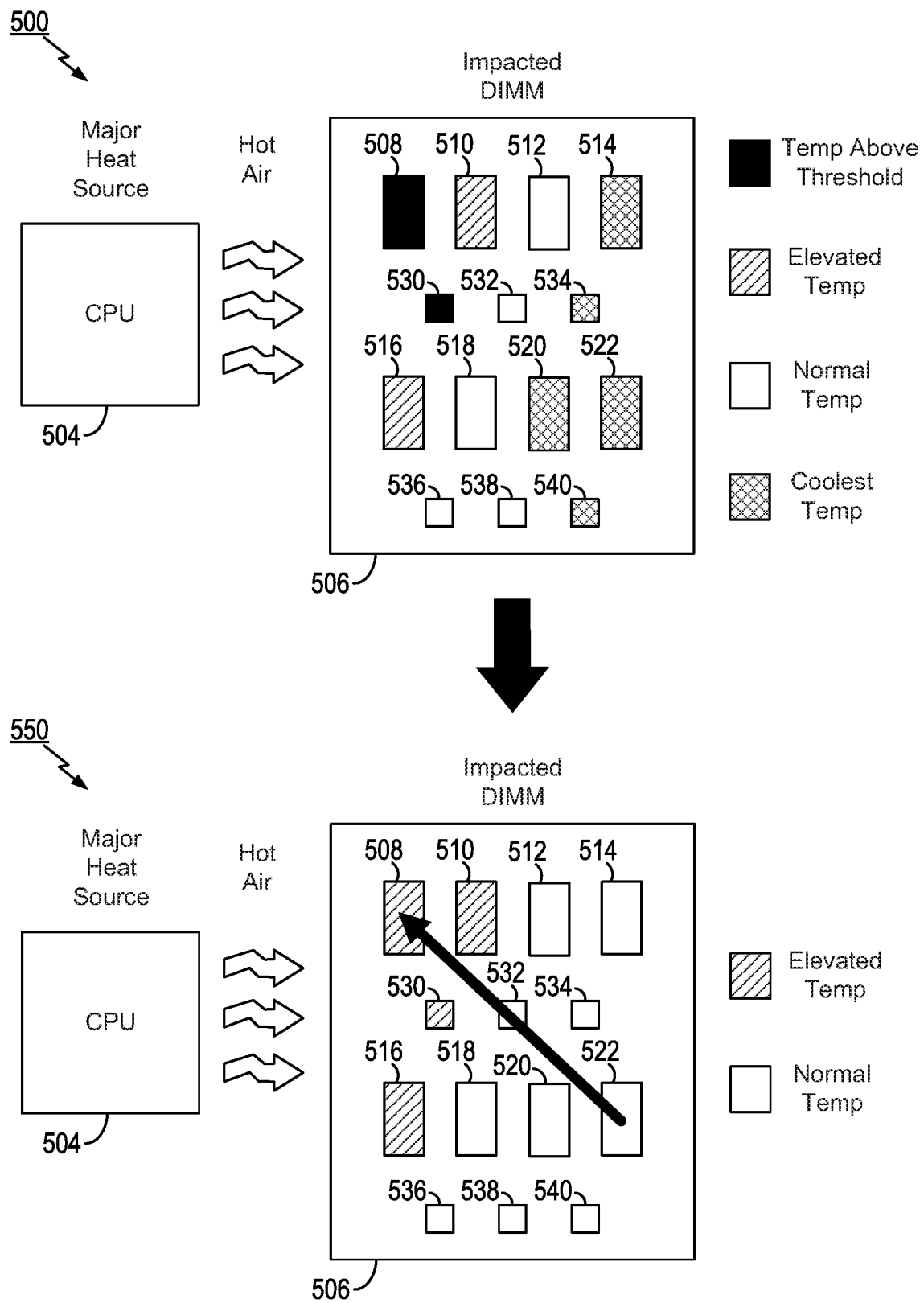
FIG. 5 illustrates diagrams of an example process for detecting one or more overheated dies/packages of a SSD via a temperature sensor and cooling the one or more overheated dies/packages of a SSD in accordance with aspects of the present disclosure.

FIG. 5 illustrates diagrams of an example process for detecting one or more overheated dies/packages of a SSD via a temperature sensor and cooling the one or more overheated dies/packages of a SSD in accordance with aspects of the present disclosure. As shown, a system 500 is similar to the system 200 of FIG. 2, the system 300 of FIG. 3, and the system 400 of FIG. 4. The system 500 includes a CPU 504 (e.g., controller 108). As the CPU 504 operates, the CPU 504 generates heat that heats/warms the air surrounding the CPU 504, and further causes hot air to move toward memory dies/packages of a SSD. As shown, memory dies/packages 508, 510, 512, 514, 516, 518, 520, and 522 are formed as part of a dual in-line memory module (DIMM) 506 (e.g., memory module 124 of NVM 114). However, it is contemplated that the memory dies/packages may be part of any other type of memory module. The DIMM 506 may further include temperature sensors 530, 532, 534, 536, 538, and 540 placed on, around, or adjacent to the memory dies.

Memory dies 514, 520, and 522 that are in remote proximity to the CPU 504 may not be within an airstream of the CPU 504 and may therefore operate at a coolest temperature (amongst other memory dies) as the hot air within the CPU's airstream least affects the temperature of the memory dies 514, 520, and 522. As such, one or more temperature sensors (e.g., sensors 534 and 540) located near the memory dies 514, 520, and 522 may detect the temperature at which these memory dies operate and inform the CPU 504 (e.g., controller 108) accordingly. Memory dies 512 and 518 that are in intermediate proximity to the CPU 504 may be within an airstream of the CPU 504 but may operate at a normal temperature as the hot air within the CPU's airstream may not affect, or only slightly affect, the temperature of the memory dies 512 and 518. As such, one or more temperature sensors (e.g., sensors 532, 536, and 538) located near the memory dies 512 and 518 may detect the temperature at which these memory dies operate and inform the CPU 504 (e.g., controller 108) accordingly.

Memory dies 510 and 516 that are in intermediate proximity to the CPU 504 may be within the CPU's airstream but not close enough to the CPU 504 such that the hot air within the CPU's airstream raises the temperature of the memory dies 510 and 516 to or above a threshold temperature level (e.g., inappropriate or unsuitably high temperature). As such, one or more temperature sensors (e.g., sensors 530, 532, and/or 536) located near the memory dies 510 and 516 may detect the temperature at which these memory dies operate and inform the CPU 504 (e.g., controller 108) accordingly. Memory die 508 that is in nearest proximity (e.g., nearest amongst other memory dies) to the CPU 504 is close enough to the CPU 504 such that the hot air within the CPU's airstream raises the temperature of the memory die 508 to or above the threshold temperature level. As such, one or more temperature sensors (e.g., sensor 530) located near the memory die 508 may detect the temperature at which the memory die operates and informs the CPU 504 (e.g., controller 108) accordingly.

As previously stated, XOR parity data may be relocated to a memory die to decrease the memory die's temperature. An example process for cooling down the overheated memory die 508 may be described with respect to a system 550. As shown, the CPU 504 is still a major heat source that causes hot air to move toward memory dies/packages of a SSD. In an aspect, one or more of the memory dies/packages (e.g. the overheated memory die 508) may be repurposed to store XOR parity data. By repurposing the overheated memory die 508 to store XOR parity data, the memory die 508 will experience less activity (since XOR parity dies are inherently less-utilized) and consequently generate less heat. As such, the temperature of the memory die 508 will decrease without having to throttle or reduce the workload capability of the die. In the example shown, upon receiving temperature information for the memory dies 508, 510, 512, 514, 516, 518, 520, and 522 from one or more of the temperature sensors 530, 532, 534, 536, 538, and 540, a controller may relocate XOR parity data from the memory die 522 having the coolest temperature to the overheated memory die 508. Accordingly, because the memory die 508 is repurposed to store XOR parity data, the memory die 508 may no longer be overheated and may operate at an elevated temperature but below the threshold temperature level.

Figure 6:
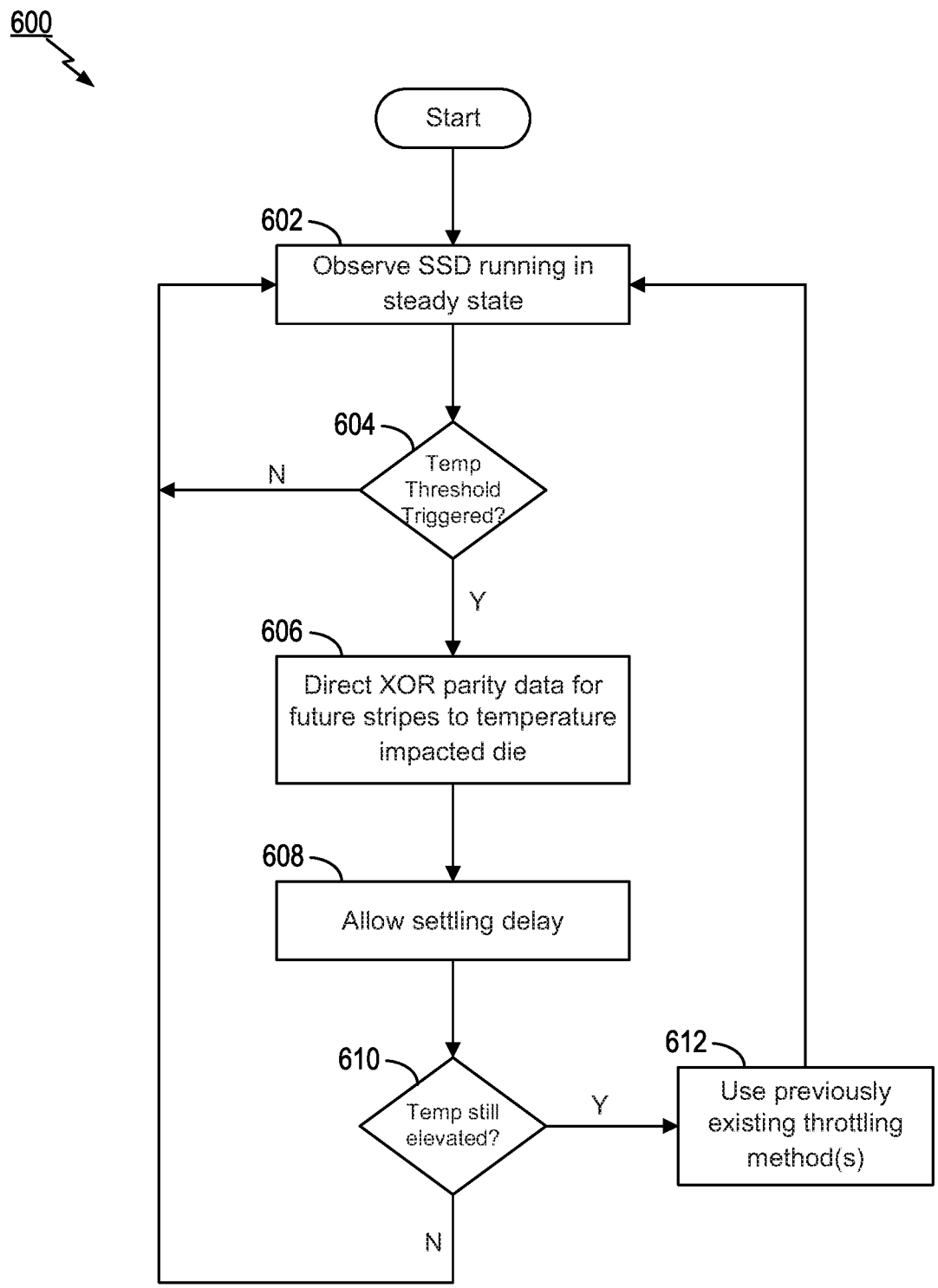
FIG. 6 illustrates a flow diagram of an exemplary method for relocating XOR parity data to an overheated die in accordance with aspects of the present disclosure.

FIG. 6 illustrates a flow diagram of an exemplary method 600 for relocating XOR parity data to an overheated die in accordance with aspects of the present disclosure. The method 600 includes observing the SSD running in steady state as shown at block 602.

Furthermore, the method 600 includes determining whether a temperature threshold is triggered at a memory die as shown at block 604. In an aspect, the temperature may be a threshold temperature level (e.g., inappropriate or unsuitably high) as described above. In another aspect, the temperature threshold does not have to be a critical threshold. The temperature threshold may be an arbitrary threshold chosen to facilitate proactive temperature management. Thus, the temperature threshold may be set to be well below the threshold temperature level such that triggering such threshold will provide a controller with ample time and/or opportunity to cool a temperature impacted memory die.

If the temperature threshold is triggered at the memory die, the method 600 further includes directing (e.g., storing) XOR parity data for future stripes to the temperature impacted die (overheated die) as shown at block 606. XOR parity data is typically organized in stripe form. Accordingly, for future write operations, the XOR parity data may be moved to the temperature impacted die. If new data is being written, the XOR parity may be written to the temperature impacted die immediately. Otherwise, garbage collection may be activated to clear the temperature impacted die of previously-stored data to make room for the XOR parity data. In an aspect, if the temperature impacted die is a fully random access memory, and if supported by the die's architecture, user data may be moved out of the temperature impacted die and replaced with the XOR parity data in a one-to-one swap operation.

After setting the XOR parity data in the temperature impacted die, the method 600 also includes allowing a settling delay as shown at block 608. Thereafter, the method 600 determines whether a temperature of the temperature impacted die is still above the temperature threshold as shown at block 610. If the temperature of the temperature impacted die is still above the temperature threshold, the method 600 includes using one or more throttling methods to lower the temperature of the die as shown at block 612. The throttling methods may include throttling a performance of an entire SSD, a CPU (controller), and/or the die itself.

Figure 7:
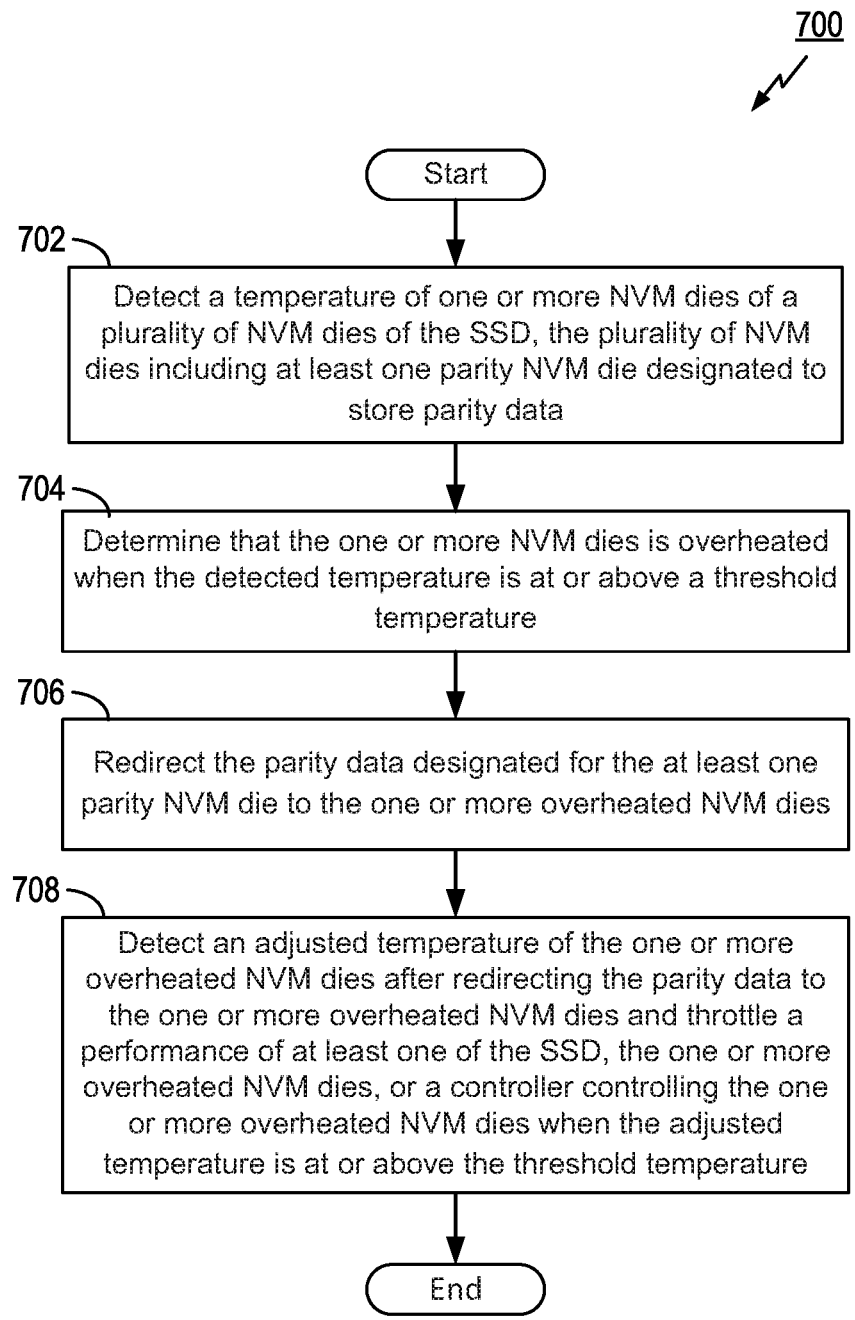
FIG. 7 illustrates a flow diagram of an exemplary method for reducing a temperature of one or more non-volatile memory (NVM) dies of a SSD in accordance with aspects of the present disclosure.

FIG. 7 illustrates a flow diagram of an exemplary method 700 for reducing a temperature of one or more non-volatile memory (NVM) dies of a solid state drive (SSD) in accordance with aspects of the present disclosure. The method 700 may be performed by a controller (e.g., controller 108).

The method 700 includes detecting a temperature of one or more NVM dies (e.g., memory dies 406) of a plurality of NVM dies of the SSD as shown at block 702. The plurality of NVM dies includes at least one parity NVM die (e.g., memory die 522) designated to store parity data. In one aspect, the SSD or a controller (e.g., NVM controller 108) of the SSD may designate the at least one parity NVM die to store the parity data. In another aspect, a NAND device or an NVM device (e.g., NVM 114) may designate the at least one parity NVM die to store the parity data. In a further aspect, a host device (e.g., host 102) may designate the at least one parity NVM die to store the parity data. In an aspect, the temperature is detected via one or more temperature sensors located on, around, or adjacent to the one or more NVM dies.

The method 700 also includes determining that the one or more NVM dies is overheated when the detected temperature is at or above a threshold temperature as shown at block 704. In an aspect, the threshold temperature is equivalent to a temperature of one or more NVM dies neighboring the one or more overheated NVM dies plus a preselected temperature amount (e.g., a number of degrees Celsius). For example, the preselected temperature amount may be 3 to 5 degrees Celsius or 5 to 10 degrees Celsius above a neighboring NVM die temperature. In one aspect, a neighboring NVM die may be a die that is a nearest distance to the one or more overheated NVM dies. In another aspect, the threshold temperature may be any arbitrary temperature specific to a memory, product, application, and/or customer. For example, the threshold temperature specific to a NAND may be 75 degrees Celsius. In another example, the threshold temperature specific to a SSD may be 55 degrees Celsius.

The method 700 also includes redirecting the parity data (e.g., XOR parity data) designated for the at least one parity NVM die to the one or more overheated NVM dies as shown at block 706. In one aspect, the redirecting the parity data includes storing the parity data in the one or more overheated NVM dies having the temperature at or above the threshold temperature instead of the at least one parity NVM die. In another aspect, the redirecting the parity data includes storing the parity data in a location alternative to the at least one parity NVM die. In an aspect, the redirecting the parity data includes selecting parity data for future write operations to be written in the one or more overheated NVM dies instead of the at least one parity NVM die. In another aspect, the redirecting the parity data includes migrating user data stored in the one or more overheated NVM dies away from the one or more overheated NVM dies, and writing the parity data into the one or more overheated NVM dies. In one aspect, the migrating the user data stored in the one or more overheated NVM dies away from the one or more overheated NVM dies includes moving the user data out of the one or more overheated NVM dies having the temperature at or above the threshold and moving the user data into at least one NVM die having a temperature below the threshold temperature. The redirecting the parity data may further include activating a garbage collection operation to facilitate migration of the user data away from the one or more overheated NVM dies. In a further aspect, when the temperature of the one or more overheated NVM dies is detected be at or above the threshold temperature, the method may, additionally or alternatively, redirect parity data (e.g., XOR parity data) designated to be stored in at least one die of the SSD (different from an NVM die) or a host, to the one or more overheated NVM dies.

The method 700 further includes detecting an adjusted temperature of the one or more overheated NVM dies after redirecting the parity data to the one or more overheated NVM dies, and throttling a performance of at least one of the SSD (e.g., SSD 104), the one or more overheated NVM dies, or a controller (e.g., controller 108) controlling the one or more overheated NVM dies when the adjusted temperature is at or above the threshold temperature as shown at block 708.

According to another aspect, a non-volatile memory (NVM) device including an apparatus for reducing a temperature of one or more NVM dies of a solid state drive (SSD) is disclosed. The apparatus may include means for detecting a temperature of one or more NVM dies of a plurality of NVM dies of the SSD, the plurality of NVM dies including at least one parity NVM die designated to store parity data. This means for detecting the temperature of the one or more NVM dies may be implemented by structure such as controller 108, or controller 108 in combination with one or more of memory 110, NVM 114, and host 102, and equivalents thereof such as logic circuitry or a dedicated processor. Additionally, this means may be further implemented with particular functional blocks or circuits such as temperature detector 118.

The apparatus may further include means for determining that the one or more NVM dies is overheated when the detected temperature is at or above a threshold temperature. This means for determining that the one or more NVM dies is overheated may be implemented by structure such as controller 108, or controller 108 in combination with one or more of memory 110, NVM 114, and host 102, and equivalents thereof such as logic circuitry or a dedicated processor. Additionally, this means may be further implemented with particular functional blocks or circuits such as temperature detector 118 and/or parity relocator 120, The apparatus may further include means for redirecting the parity data designated for the at least one parity NVM die to the one or more overheated NVM dies. This means for redirecting the parity data to the one or more overheated NVM dies may be implemented by structure such as controller 108, or controller 108 in combination with one or more of memory 110, NVM 114, and host 102, and equivalents thereof such as logic circuitry or a dedicated processor. Additionally, this means may be further implemented with particular functional blocks or circuits such as temperature detector 118, parity relocator 120, and/or garbage collector 122.

The apparatus may further include means for detecting an adjusted temperature of the one or more overheated NVM dies after redirecting the parity data to the one or more overheated NVM dies. This means for detecting the adjusted temperature may be implemented by structure such as controller 108, or controller 108 in combination with one or more of memory 110, NVM 114, and host 102, and equivalents thereof such as logic circuitry or a dedicated processor. Additionally, this means may be further implemented with particular functional blocks or circuits such as temperature detector 118.

The apparatus may further include means for throttling a performance of at least one of the SSD, the one or more overheated NVM dies, or a controller controlling the one or more overheated NVM dies when the adjusted temperature is at or above the threshold temperature. This means for throttling the performance may be implemented by structure such as controller 108, or controller 108 in combination with one or more of memory 110, NVM 114, and host 102, and equivalents thereof such as logic circuitry or a dedicated processor. Additionally, this means may be further implemented with particular functional blocks or circuits such as temperature detector 118, parity relocator 120, and/or garbage collector 122.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of reducing a temperature of one or more non-volatile memory (NVM) dies of a solid state drive (SSD), the method comprising:
    detecting a temperature of one or more NVM dies of a plurality of NVM dies of the SSD, the plurality of NVM dies including at least one parity NVM die designated to store parity data;
    determining that the one or more NVM dies is overheated when the detected temperature is at or above a threshold temperature, wherein the threshold temperature is equivalent to a temperature of one or more NVM dies neighboring the one or more overheated NVM dies plus a preselected temperature amount; and
    redirecting the parity data designated for the at least one parity NVM die to the one or more overheated NVM dies.

2. The method of claim 1, wherein the redirecting the parity data includes selecting parity data for future write operations to be written in the one or more overheated NVM dies instead of the at least one parity NVM die.

3. The method of claim 1, wherein the redirecting the parity data includes:
    migrating user data stored in the one or more overheated NVM dies away from the one or more overheated NVM dies; and
    writing the parity data into the one or more overheated NVM dies.

4. The method of claim 3, wherein the redirecting the parity data further includes activating a garbage collection operation to facilitate migration of the user data away from the one or more overheated NVM dies.

5. The method of claim 1, further comprising:
    detecting an adjusted temperature of the one or more overheated NVM dies after redirecting the parity data to the one or more overheated NVM dies; and
    throttling a performance of at least one of the SSD, the one or more overheated NVM dies, or a controller controlling the one or more overheated NVM dies when the adjusted temperature is at or above the threshold temperature.

6. The method of claim 1, wherein the threshold is at least one of:
    a memory-specific temperature;
    a product-specific temperature;
    an application-specific temperature; or
    a customer-specific temperature.

7. A solid state drive (SSD), comprising:
    a plurality of non-volatile memory (NVM) dies; and
    a controller communicatively coupled to a host device and the plurality of NVM dies, wherein the controller is configured to:
        detect a temperature of one or more NVM dies of the plurality of NVM dies of the SSD, the plurality of NVM dies including at least one parity NVM die designated to store parity data,
        determine that the one or more NVM dies is overheated when the detected temperature is at or above a threshold temperature, wherein the threshold temperature is equivalent to a temperature of one or more NVM dies that is a nearest distance to the one or more overheated NVM dies plus a preselected temperature amount, and
        redirect the parity data designated for the at least one parity NVM die to the one or more overheated NVM dies.

8. The solid state drive of claim 7, wherein the controller configured to redirect the parity data is further configured to store the parity data in the one or more overheated NVM dies instead of the at least one parity NVM die.

9. The solid state drive of claim 7, wherein the controller configured to redirect the parity data is further configured to store the parity data in a location alternative to the at least one parity NVM die.

10. The solid state drive of claim 7, wherein the controller configured to redirect the parity data is further configured to:
    migrate user data stored in the one or more overheated NVM dies away from the one or more overheated NVM dies; and
    write the parity data into the one or more overheated NVM dies.

11. The solid state drive of claim 10, wherein the controller configured to migrate the user data is further configured to:
    move the user data out of the one or more overheated NVM dies; and
    move the user data into at least one NVM die having a temperature below the threshold temperature.

12. The solid state drive of claim 7, wherein the controller configured to detect the temperature of the one or more NVM dies is further configured to detect the temperature via one or more temperature sensors located adjacent to the one or more NVM dies.

13. A non-volatile memory (NVM) device including an apparatus for reducing a temperature of one or more NVM dies of a solid state drive (SSD), the apparatus comprising:
    means for detecting a temperature of one or more NVM dies of a plurality of NVM dies of the SSD, the plurality of NVM dies including at least one parity NVM die designated to store parity data;
    means for determining that the one or more NVM dies is overheated when the detected temperature is at or above a threshold temperature, wherein the threshold temperature is equivalent to a temperature of one or more NVM dies that is a nearest distance to the one or more overheated NVM dies plus a preselected temperature amount; and
    means for redirecting the parity data designated for the at least one parity NVM die to the one or more overheated NVM.

14. The apparatus of claim 13, wherein the means for redirecting the parity data is configured to select parity data for future write operations to be written in the one or more overheated NVM dies instead of the at least one parity NVM die.

15. The apparatus of claim 13, wherein the means for redirecting the parity data is configured to:
- move user data out of the one or more overheated NVM dies;
- move the user data into at least one NVM die having a temperature below the threshold temperature; and
- write the parity data into the one or more overheated NVM dies.

16. The apparatus of claim 13, further comprising:
- means for detecting an adjusted temperature of the one or more overheated NVM dies after redirecting the parity data to the one or more overheated NVM dies; and
- means for throttling a performance of at least one of the SSD, the one or more overheated NVM dies, or a controller controlling the one or more overheated NVM dies when the adjusted temperature is at or above the threshold temperature.

17. The apparatus of claim 13, wherein the means for detecting the temperature of the one or more overheated NVM dies is configured to detect the temperature via one or more temperature sensors located adjacent to the one or more overheated NVM dies.

\* \* \* \* \*